United States Patent [19]

Berry

[11] 4,303,946

[45] Dec. 1, 1981

[54] VIDEO STAND AND METHOD OF EXHIBITING INFORMATIONAL PROGRAMS

[76] Inventor: Mac L. Berry, P.O. Box 20002, Salisbury, N.C. 28144

[21] Appl. No.: 119,729

[22] Filed: Feb. 8, 1980

[51] Int. Cl.³ .............................................. H04N 5/64
[52] U.S. Cl. ..................................... 358/254; 358/87; 312/7.2; 353/74; D16/14
[58] Field of Search ........................... 358/254, 87, 93; 312/7 TV; 353/74; D14/43; D16/14

[56] References Cited

U.S. PATENT DOCUMENTS

| | | | |
|---|---|---|---|
| 3,727,000 | 4/1973 | Lollos | 358/254 |
| 3,735,041 | 5/1973 | Fujita | 358/254 |
| 4,031,543 | 6/1977 | Holz | 358/86 |

FOREIGN PATENT DOCUMENTS 1074533  1/1964  United Kingdom ............... 358/254

*Primary Examiner*—Marc E. Bookbinder
*Assistant Examiner*—Edward L. Coles
*Attorney, Agent, or Firm*—Sughrue, Mion, Zinn, Macpeak & Seas

[57] ABSTRACT

A video exhibit stand and method of exhibiting informational programs comprises a housing having a plurality of large and small openings therein and arranged around the periphery thereof. A plurality of cathode ray tubes and audio speakers are supported within the housing with the screens of the cathode ray tubes secured within the large openings and the audio speakers secured within the small openings. Video transmitter means within the housing conducts informational programs recorded on cassette tapes to a four-way signal splitter which splits the video signal into four distinct but identical signals. These signals are conducted to the inputs of the cathode ray tubes and the audio signals are conducted to the audio speakers. The exhibit stand is portable and may be located at the juncture of hallways where people may view the cathode ray screens from all directions. A plurality of such video stands may be located at remote points in a large auditorium room or in separate remote rooms. A transmitter at a remote central station sends four distinct but identical signals to the plurality of remotely located video exhibit stands where they are received by the four-way signal splitter within the housing. The splitter within the housing further splits the signal into four distinct but identical signals carrying identical information. The signals are conducted to the inputs of the cathode ray tubes whereby the signals appear on the screens thereof for viewing from all angles.

10 Claims, 5 Drawing Figures

VIDEO STAND AND METHOD OF EXHIBITING INFORMATIONAL PROGRAMS

BACKGROUND OF THE INVENTION

1. Field of the Invention

This invention relates to exhibit stands and more particularly to video exhibit stands comprising a housing, a base having a standard attached to the base at one end thereof and to the housing at the opposite end thereof. A plurality of large and small openings are arranged around the periphery of said housing and a closure hinged to the housing permits vertically upward moving of the closure away from the housing exposing the interior thereof. Secured on supports spanning the interior of said housing are a plurality of cathode ray tubes having the screens thereof secured within the large openings. Audio speakers means are secured within the small openings alternating between the screens of the cathode ray tubes. An electronic four-way signal splitter is supported within the housing between the plurality of cathode ray tubes. Cable means connect the outputs of the signal splitter and the inputs of the cathode ray tubes. Video transmitter means supported within the housing above the cathode ray tubes has the output thereof connected to the inputs of the four-way signal splitter whereby video signals from the video transmitter are conducted to the four-way signal splitter. Cable means connect the outputs of the four-way signal splitter to the audio speakers. The four-way signal splitter divides the video signal into four distinct but identical signals each containing identical information. Said four distinct and identical signals are each fed to the inputs of the cathode ray tubes and audio speakers whereby the information is displayed on the cathode ray tubes and the audio on the audio speakers. The information on said screens and speakers may be seen and heard from all directions. The video transmitter may be in the form of a video cassette located within the video exhibit stand housing or a video cassette located at a remote central station and being connected to the exhibit stand or stands by cable means. Furthermore, the video transmitter may be in the form of a mini TV transmitter which may be located at a central station for broadcasting informational programs to the video exhibit stand or a plurality of video exhibit stands located at remote locations.

2. Statement of the Prior Art

Prior developments in this field are shown, by way of general illustration, in the below listed patents:

| Inventor | U.S. Pat. No. | Issue Date |
| --- | --- | --- |
| Miller, Jr. | 3,830,855 | April 24, 1962 |
| Burton | 4,021,133 | March 15, 1977 |
| Steiner | 3,985,430 | Oct. 12, 1976 |

SUMMARY OF THE INVENTION

The invention hereof provides a portable video exhibit stand having a housing for supporting a plurality of cathode ray tubes and audio speakers therein. The screens of the cathode ray tubes and the speakers are secured within openings in the walls of the housing of said exhibit stand. Video transmitter means secured within the housing feeds informational signals to the input of the four-way signal splitter which divides the informational signal into four distinct but identical signals which are then fed into the inputs of the cathode ray tubes. The video transmitter may be programmed to provide as many different informational programs as desired to suit the intended audience.

The video exhibit stand may be placed at the juncture of hallways in a concourse or in a large room or remote rooms whereby people in the proximity of said stands may view the information projected on the cathode ray tubes from all angles. The video transmitter may be in the form of a video cassette having means for receiving a pre-tape recorded cassette. Alternatively, the video transmitter may be in the form of a video cassette located at a remote central station from which the video signals may be transmitted to the video exhibit stands by means of cables or the like. Furthermore, the video transmitter may be in form of a mini TV transmitter located at the remote central station which broadcasts informational programs by cable means or conventional TV broadcasting means to a receiving antenna located on the video stand.

The method of exhibiting informational programs comprises the steps of placing a plurality of exhibit stands at remote locations, locating video transmitter means at a central station remote from the exhibit stands, boosting the video signal prior to transmitting, splitting the video signal into four distinct but identical signals containing identical information, transmitting the four distinct but identical signals to the four-way signal splitter contained within each of the exhibit stands, and displaying the information on the screens of each of the cathode ray tubes in each of the exhibit stands whereby people at the remote locations may view the screens from all directions.

DESCRIPTION OF THE PREFERRED EMBODIMENT

Figure 1:
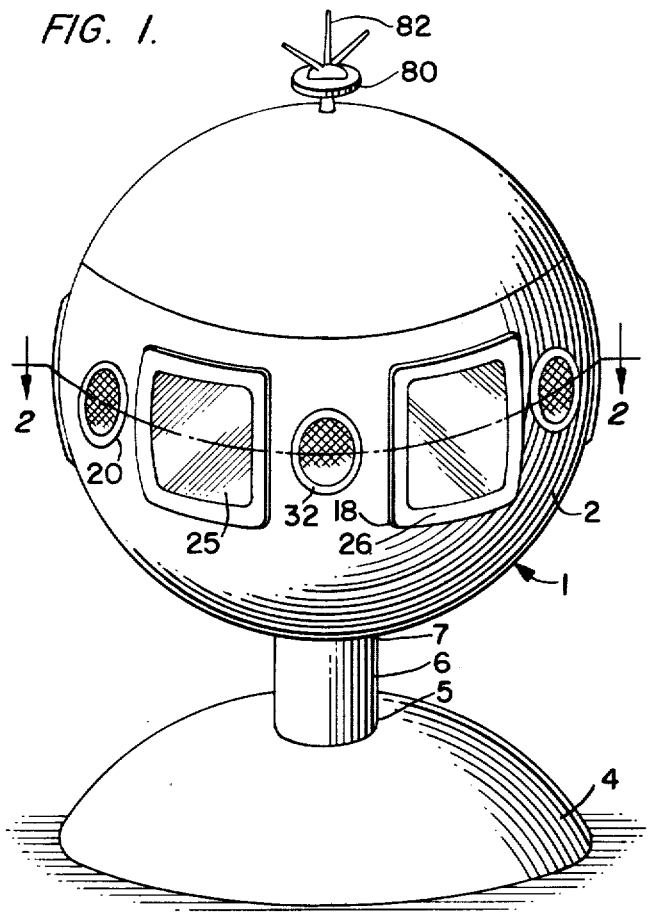
FIG. 1 is a side elevational view of the exhibit stand showing a housing having large and small openings around the periphery thereof, an antenna for receiving communications, and a support base.
Figure 2:
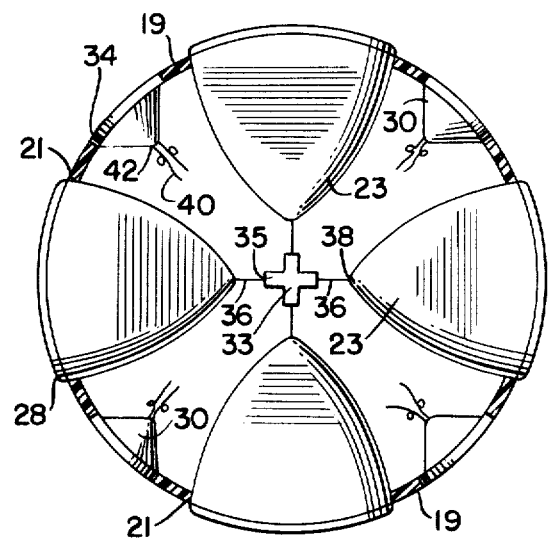
FIG. 2 is a plan view in section showing cathode ray tubes and speakers attached within the openings.
Figure 3:
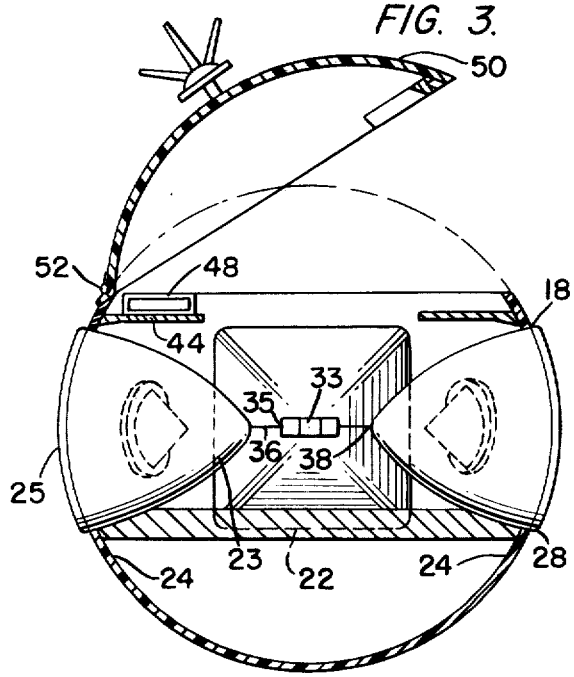
FIG. 3 is a side elevational view in section showing cathode ray tubes positioned within the large openings, a signal splitter between the cathode ray tubes, a transmitter and a partially open lid.
Figure 4:
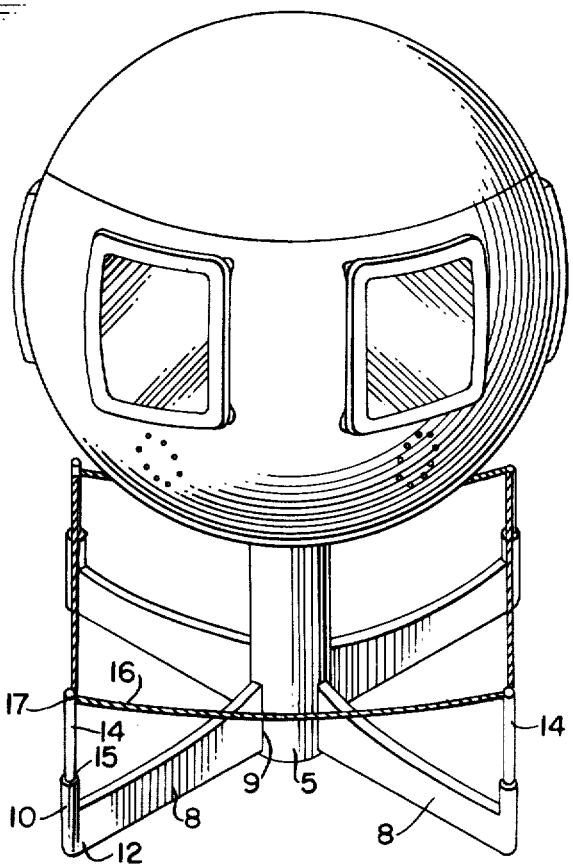
FIG. 4 is a view similar to FIG. 1 showing a different support base.

Referring to the drawings in more detail, a video exhibit stand 1 of the present invention comprises a housing 2, a support base therefore which in one form is an inverted dome and a vertical standard 6 secured to said base at one end 5 thereof and to the housing 2 at the other end 7. Support base 4 may be in the form as shown in FIG. 4 having a plurality of radially extending legs 8 having the ends thereof secured to the end of the standard 5. The legs 8 may be of any length to insure proper balance of the stand. Legs 8 have a plurality of hollow tubes 10 secured in vertical orientation to the outer ends 12 of the legs. Rods 14 are received into the hollow tubes 10 at one end 15 thereof. The opposite ends 17 of said rods have barrier means 16 secured to ends 17 of said rods and extend between said rods acting as a barrier to prevent people from walking into the exhibit stand and knocking it over.

The housing 2 has a plurality of large openings 18 which alternate between a plurality of smaller openings 20. Means 22 secured to and extending between the inter walls 24 of the housing 2 support a plurality of cathode ray tubes 23, the screens 25 of which are secured within the large openings 18. A plurality of audio speakers 30 are secured within the smaller openings 20. Border means 26 cover the edges 21 of the opening 18 and the edges 28 of the cathode ray screens and border means 32 covers the edges 19 of opening 20 and edges 34 of the speakers. Means within the housing support a four-way electronic signal splitter 33 the outputs 35 of which are fed by cable means 36 to the inputs 38 of the respective cathode ray tubes. Cable means 40 feed the audio signal from the output of the four-way electronic signal splitter to the input terminals 42 of the respective audio speakers. Means 44 within the housing and above the cathode ray tubes 23 support a video transmitter 48. The video transmitter 48 has means (not shown) for connecting the output thereof to the inputs (not shown) of the electronic signal splitter. The input signal to each of the cathode ray tubes from the electronic signal splitter appears on the screens of the cathode ray tubes in a conventional manner.

The housing 2 has a closure 50 hinged at 52 to the housing 2 adjacent support 44. The closure 50 swings vertically upward to allow access to the interior of the housing.

The video exhibit stand so constructed is portable and may be positioned in the center of a large room, at the junction of hallways, in remote areas of a large auditorium or in different rooms in a convention center whereby people passing by the exhibit stands or in the vicinity thereof may view the cathode ray screens from all angles and see the program as transmitted by the video transmitter.

Figure 5:
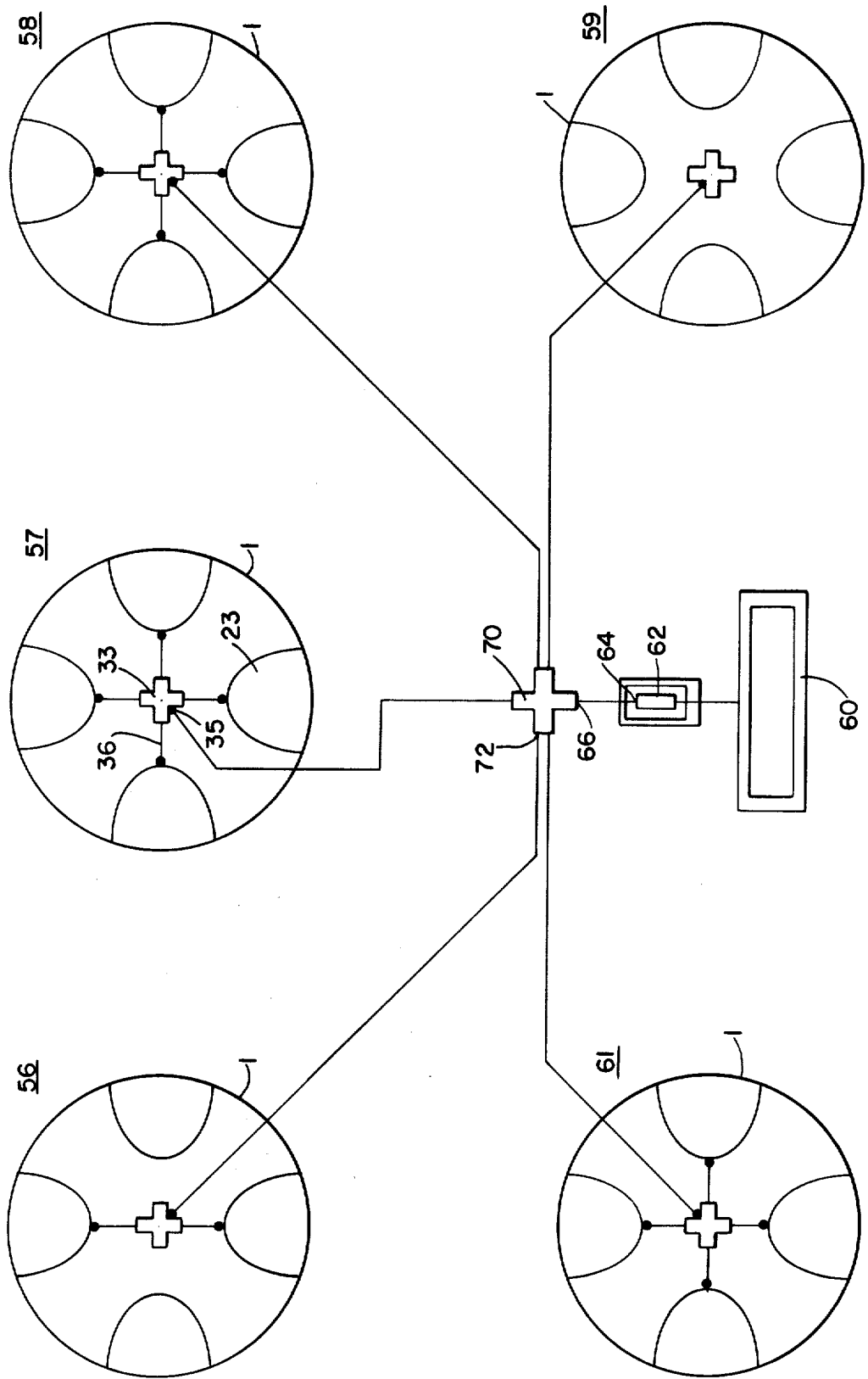
FIG. 5 is a block diagram showing a plurality of exhibit stands connected to a remote video transmitter.

FIG. 5 is a diagram showing a plurality of video exhibit stands' located at different remote locations 56, 57, 58, 59 & 61. Video transmitter 60 feeds a signel booster 62 the output 64 of which is fed to the input 66 of a four-way electronic signal splitter 70. The outputs 72 of the signal splitter 70 are conducted by suitable means to the input 35 of the four-way electronic signal splitter 33 within the housing 2 of the exhibit stand. The outputs 35 of the latter signal splitter are fed to the cathode ray screens as described above. By this construction and arrangement, a number of audiences at different locations may view the screens and hear the program simultaneously.

The video transmitter 60 may be in the form of a mini TV transmitter or cable television transmitter whereby signals are fed by cable means or conventional television transmitting means to the exhibit stands. When a conventional television transmitter is utilized, an antenna 80 having receiving members 82 picks up the transmitted signal and feeds the signal by suitable means to the four-way electronic signal splitter within the housing tube.

The foregoing description is considered illustrative only of the principle embodiments of the invention. Numerous modifications and changes may readily occur to those skilled in the art to which this invention pertains. The description hereinabove is not considered to be limited to the exact construction and operation. Substituted modifications may be resorted to without departing from the spirit and scope of the invention as herein claimed.

What I claim is:

1. A video exhibit stand comprising:
   a housing having outer and inner walls and a vertically upwardly swinging closure;
   a base in the form of an inverted dome for supporting said housing;
   a standard secured to the base at one end thereof, and to the housing at the opposite end thereof;
   a plurality of alternating larger and smaller openings within the walls of the housing and arranged around the periphery thereof;
   a plurality of cathode ray tubes having inputs thereon supported within the housing and having the screens thereof secured within the larger openings;
   audio speakers having inputs thereon supported within the smaller openings, said smaller openings alternating between the larger openings;
   a video transmitter having output means thereon;
   a four-way electronic signal splitter having input and output means thereon, said inputs connected to the outputs of the video transmitter whereby informational program signals are transmitted to the four-way electronic signal splitter;
   cable means connecting the output of said four-way electronic signal splitter to the inputs of the cathode ray tubes; and
   said four-way electronic signal splitter producing four distinct but identical informational signals which are conducted to the inputs of the cathode ray tubes where said informational programs appear on said screens.

2. A video exhibit stand as defined in claim 1, wherein:
   said housing is spherical in form having an access opening at the top thereof, and said vertically upwardly extending closure is dome shaped corresponding to said opening.

3. Video exhibit stand as defined in claim 1, wherein:
   said base has a plurality of feet secured at their ends to the end of said standard;
   said feet extending radially horizontally outward from said standard; and
   a plurality of hollow tubes secured in vertically orientation to the opposite ends of said feet;
   a plurality of rods having upper and lower ends, the lower ends of which are inserted into said vertically oriented tubes; and
   barrier means secured to the upper ends of said rods and incirclying said housing whereby people are prevented from walking into and knocking over said video exhibit stand.

4. Video exhibit stand as defined in claim 1, wherein:
   said larger and smaller openings having border means on the outside thereof closing the juncture between the wall and the cathode ray tubes and audio speakers.

5. A video exhibit stand as defined in claim 1, wherein:
   said video transmitter is located at a remote central location and having means for connecting the output of said transmitter to the four-way electronic signal splitter within the housing of the exhibit stand.

6. A video exhibit stand as defined in claim 1, wherein:

said closure is in the form of a dome corresponding to the access opening in said housing and a receiving antenna secured to said closure having means connecting said antenna to the four-way signal splitter within the housing for conducting the signals received thereon to said four-way electronic signal splitter within the housing of exhibit stand.

7. A video exhibit stand as defined in claim 1, wherein:
said video transmitter is a video cassette and said informational programs are pre-recorded on video cassette tapes.

8. A method of exhibiting informational programs comprising the steps of:
placing a plurality of video exhibit stands having multiple viewing screens around the periphery thereof at remote locations within a large auditorium or within different conference rooms in a convention center;
locating video transmitter means at a central station remote from the exhibit stands;
boosting the video signal prior to transmitting;
splitting the video signal into four distinct but identical signals containing identical informational programs;
transmitting said four distinct but identical signals to a four-way electronic signal splitter within each of the video exhibit stands;
splitting the signal by the four-way signal splitter within each of the video stands; and
displaying said informational programs on each of the screens of the cathode ray tubes of each of the video exhibit stands whereby people at said remote locations passing by or in proximity to said exhibit stands may view said screens from all directions.

9. A method of exhibiting informational programs as defined in claim 8, wherein:
said video transmitter means is a mini TV transmitter.

10. A method of exhibiting informational programs as defined in claim 8, wherein:
said video transmitter means is a cable television transmitter.

* * * * *